United States Patent
Matsuda

(10) Patent No.: US 8,068,089 B2
(45) Date of Patent: Nov. 29, 2011

(54) ELECTROPHORETIC DISPLAY APPARATUS AND DRIVING METHOD THEREOF

(75) Inventor: Yojiro Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1252 days.

(21) Appl. No.: 10/552,976

(22) PCT Filed: Jan. 26, 2005

(86) PCT No.: PCT/JP2005/001439
§ 371 (c)(1),
(2), (4) Date: Jul. 31, 2006

(87) PCT Pub. No.: WO2005/071481
PCT Pub. Date: Aug. 4, 2005

(65) Prior Publication Data
US 2006/0279525 A1    Dec. 14, 2006

(30) Foreign Application Priority Data

Jan. 27, 2004  (JP) .................. 2004-019056

(51) Int. Cl.
*G09G 3/34* (2006.01)
(52) U.S. Cl. ....................... 345/107; 359/296
(58) Field of Classification Search .................. 345/107, 345/84; 430/31–38; 359/296
See application file for complete search history.

(56) References Cited

U.S. PATENT DOCUMENTS

| | | | |
|---|---|---|---|
| 3,612,758 A | 10/1971 | Evans | 178/5.4 R |
| 6,118,426 A | 9/2000 | Albert et al. | 345/107 |
| 6,486,866 B1 * | 11/2002 | Kuwahara et al. | 345/107 |
| 6,636,186 B1 * | 10/2003 | Yamaguchi et al. | 345/31 |
| 6,639,580 B1 * | 10/2003 | Kishi et al. | 345/107 |
| 6,738,039 B2 * | 5/2004 | Goden | 345/107 |
| 7,227,525 B2 * | 6/2007 | Kishi | 345/107 |

(Continued)

FOREIGN PATENT DOCUMENTS

| | | |
|---|---|---|
| JP | 09-211499 | 8/1997 |
| JP | 11-202804 | 7/1999 |
| KR | 2002-0093986 | 12/2002 |
| WO | WO 02/073304 | 9/2002 |

*Primary Examiner* — Jason Mandeville
(74) *Attorney, Agent, or Firm* — Fitzpatrick, Cella, Harper & Scinto

(57) ABSTRACT

A display apparatus includes a first substrate provided with a closed container, two types of charged particles held in the closed container and having mutually different charge polarities and a substantially identical color, and first, second and third electrodes for generating an electric field in the closed container, with the third electrode being disposed on the first substrate. The display apparatus alternately executes a first display operation and a second display operation, wherein in the first display operation, the charged particles create a first distribution on a first electrode side by changing a voltage applied to the second electrode or the third electrode after a first reset operation in which the charged particles create a second distribution on a second electrode side and on a third electrode side by applying a first voltage to the second electrode and to the third electrode. In the second display operation, the charged particles create a third distribution on the first electrode side by changing a voltage applied to the second electrode or the third electrode after a second reset operation in which the charged particles create a fourth distribution, substantially identical to the second distribution, on the second electrode side and on the third electrode side by applying a second voltage, opposite in polarity to the first voltage, to the second electrode and to the third electrode.

4 Claims, 11 Drawing Sheets

U.S. PATENT DOCUMENTS

| | | | |
|---|---|---|---|
| 7,230,751 B2 * | 6/2007 | Whitesides et al. | 359/296 |
| 7,283,119 B2 * | 10/2007 | Kishi | 345/107 |
| 2003/0231162 A1 * | 12/2003 | Kishi | 345/107 |
| 2005/0270267 A1 * | 12/2005 | Johnson | 345/107 |

* cited by examiner (a)

ELECTROPHORETIC DISPLAY APPARATUS AND DRIVING METHOD THEREOF

TECHNICAL FIELD

The present invention relates to a display apparatus, such as an electrophoretic display apparatus which effects display on the basis of movement of (electrophoretic) migration particles, and a driving method of the electrophoretic display apparatus.

BACKGROUND ART

In recent years, an amount of information which an individual can deal with has been significantly measured due to a remarkable advance of digital technology. In connection with this, development of display as information output means has been performed actively, so that technological innovation for displays of high usabilities, such as high definition, low power consumption, light weight, thin shape, etc., has been continued. Particularly, in recent times, a high-definition display which is easy to read and has a display quality equivalent to printed matter has been desired. The display of this type is a technique indispensable to a next-generation product, such as electronic paper, electronic book, etc.

Incidentally, as a candidate for such displays, Evans et al. have proposed an electrophoretic display apparatus in which a dispersion medium containing colored charged electrophoretic (migration) particles and a coloring agent is disposed between a pair of substrates and an image with a contrast color between the colored charged migration particles and the colored dispersion medium is formed, in U.S. Pat. No. 3,612,758.

In such an electrophoretic display apparatus, however, there has arisen a problem such that a life of the display apparatus and a contrast are lowered due to inclusion of the coloring agent such as a dye. In view of these problems, such electrophoretic display apparatuses that an image with a contrast color between colored charged migration particles dispersed in a transparent dispersion medium and a coloring layer disposed on a substrate is formed without coloring the dispersion medium have been proposed in Japanese Laid-Open Patent Applications (JP-A) No. Hei 11-202804 and Hei 09-211499.

Incidentally, in such conventional electrophoretic display apparatuses, the migration particles are moved by an electric field, so that a DC voltage is applied to a display device at the time of display rewriting. However, when such display rewriting is repeated many times, the DC voltage is consequently applied to the display device for a long time in some cases.

Further, when the DC voltage is applied to the display device for a long time as described above, a spatial electric charge distribution is created in an insulating layer or a dispersion medium by electrons, ions, etc., and is accumulated as a residual DC component. As a result, the voltage applied to the migration particles fluctuates, so that there arises such a problem of display burn-in that a predetermined gradation optical level cannot be obtained.

DISCLOSURE OF THE INVENTION

The present invention has been accomplished in view of the above described circumstances.

An object of the present invention is to provide an electrophoretic display apparatus capable of repetitively effecting stable display.

Another object of the present invention is to provide a driving method of the electrophoretic display apparatus.

According to a first aspect of the present invention, there is provided a display apparatus, comprising:

a first substrate provided with a closed container, a pair of electrodes for generating an electric field in the closed container, and charged particles held in the closed container, the charged particles being moved by the electric field to determine a distribution of the charged particles in the closed container, thereby to effect display, wherein the charged particles are of two types which have mutually different charge polarities and a substantially identical color.

More specifically, in an electrophoretic display apparatus including a first substrate and a second substrate which are disposed with a predetermined spacing therebetween to provide a closed space, and migration particles (charged particles) of two types dispersed in the closed space, the migration particles of two types have mutually different charge polarities and a substantially identical color.

Further, the electrophoretic display apparatus of the present invention may preferably be provided with a display electrode for changing a distribution of the migration particles so as to effect display, and a display voltage of a predetermined polarity and a display voltage of a polarity opposite to the predetermined polarity are alternately applied to the display electrode, thereby to change the distribution of the migration particles.

The electrophoretic display apparatus may preferably be provided with first and second reset electrodes for changing a distribution of the migration particles so as to reset the display, a reset voltage of a predetermined polarity and a reset voltage of a polarity opposite to the predetermined polarity are alternately applied to the first and second reset electrodes.

The electrophoretic display apparatus may preferably include a partition wall for holding the first and second substrates at a certain spacing, the display electrode provided to the first substrate and second substrate, and the first and second reset electrodes disposed opposite to the partition wall.

The electrophoretic display apparatus may preferably include the display electrode provided to one of the first substrate and the second substrate, and the first and second reset electrodes provided to the other one substrate.

In a preferred embodiment of the present invention, the display electrode is a common electrode, the voltage of the predetermined polarity is a relative potential difference between the common electrode and one of the first and second reset electrodes, and a display voltage which is opposite in polarity to the voltage of the predetermined polarity is a relative potential difference between the common electrode and the other one reset electrode.

According to another aspect of the present invention, there is provided an electrophoretic display apparatus comprising:

first and second substrates disposed with a predetermined spacing therebetween to provide a closed space, and migration particles dispersed in the closed space, a distribution of the migration particles being changed in the closed space to effect display, wherein the apparatus further comprises a display electrode for changing the distribution of the migration particles to effect display, and a dispersion medium which is filled in the closed space and has a relative dielectric constant different from the migration particles which are dispersed in the dispersion medium, and wherein the migration particles are migration particles of two types having different charge polarities and a substantially identical color, and a display voltage of a predetermined polarity and a display voltage of a polarity opposite to the predetermined polarity of the display voltage are alternately applied to the display electrode.

In a preferred embodiment, the electrophoretic display apparatus further comprises a reset electrode for changing a distribution of the migration particles to reset the display, and the display electrode and the reset electrode are disposed to provide a non-uniform electric field distribution therebetween, and an AC voltage is applied to the display electrode when the display is reset.

The electrophoretic display apparatus may preferably further comprise a partition wall for holding the first and second substrates at a certain spacing, and the display electrode is disposed on the first substrate or the second substrate and the reset electrode is disposed opposite to the partition wall.

In a preferred embodiment of the present invention, an operation for moving the migration particles in a strong electric field area of the non-uniform electric field distribution is a reset operation when a relative dielectric constant of the migration particles is larger than that of the dispersion medium, and an operation for moving the migration particles in a weak electric field area of the non-uniform electric field relative dielectric constant of the migration particles is smaller than that of the dispersion medium.

Further, the electrophoretic display apparatus may preferably comprise a microcapsule, as the closed space, disposed between the first and second substrates.

According to a further aspect of the present invention, there is provided a driving method for driving a display apparatus, comprising a first substrate and a second substrate provided with a closed space therebetween, charged (migration) particles of two types which have mutually different charge polarities and a substantially identical color and are dispersed and held in the closed container, and an electrode for generating an electric field in the closed container, wherein a distribution of the migration particles in the closed container is changed to effect display;

the driving method comprising the steps of:

providing a display electrode for changing a distribution of the migration particles to effect the display and first and second reset electrodes for changing the distribution of the migration particles to reset the display, and repeating a first reset operation for performing reset of the display by applying a reset voltage of a predetermined polarity to the first and second reset electrodes, a first display operation for performing the display by applying a display voltage of a predetermined polarity to the display electrode, a second reset operation for performing reset of the display by applying a reset voltage of a polarity opposite to the predetermined polarity of the reset voltage to the first and second electrodes, and a second display operation for performing the display by applying a display voltage of a polarity opposite to the predetermined polarity to the display electrode.

According to a still further aspect of the present invention, there is provided a driving method for driving an electrophoretic display apparatus comprising first and second substrates disposed with a predetermined spacing therebetween to provide a closed space, and migration particles dispersed in the closed space, a distribution of the migration particles being changed in the closed space to effect display;

the method comprising the steps of:

providing a display electrode for changing the distribution of the migration particles to effect display, a reset electrode for changing the display rewriting of the migration particles to reset the display, and a dispersion medium which has a relative dielectric constant different from the migration particles which are dispersed in the dispersion medium, and using migration particles of two types having different charge polarities and a substantially identical color as the migration particles, arranging the display electrode and the reset electrode so as to provide a non-uniform electric field distribution therebetween, and repeating a first display operation for performing the display by applying a display voltage of a predetermined polarity to the display electrode, a reset operation for performing reset of the display by applying an AC voltage to the display electrode, and a second display operation for performing the display by applying a display voltage of a polarity opposite to the predetermined polarity to the display electrode.

According to the present invention, as the migration particles, those of two types which have mutually different charge polarities and a substantially identical color are used, so that it becomes possible to drive the electrophoretic display apparatus by an AC voltage. Further, by alternately applying a display voltage of a predetermined polarity and a display electrode of a polarity opposite to the predetermined polarity to the display electrode for changing the distribution of the migration particles to effect display, even when the display or rewriting of the display is repetitively performed, it is possible to prevent accumulating of residual DC component to perform stable display repetitively.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 8(a) and 8(b) are schematic views for explaining a driving method for driving the electrophoretic display device according to the embodiment of the present invention.

FIGS. 10(a) and 10(b) are schematic views for explaining a driving method for driving the electrophoretic display device according to the embodiment of the present invention.

FIGS. 11(a) and 11(b) are schematic views for explaining another driving method for driving the electrophoretic display device according to the embodiment of the present invention.

BEST MODE FOR CARRYING OUT THE INVENTION

Hereinbelow, preferred embodiments for carrying out the present invention will be described with reference to the drawings.

Figure 1:
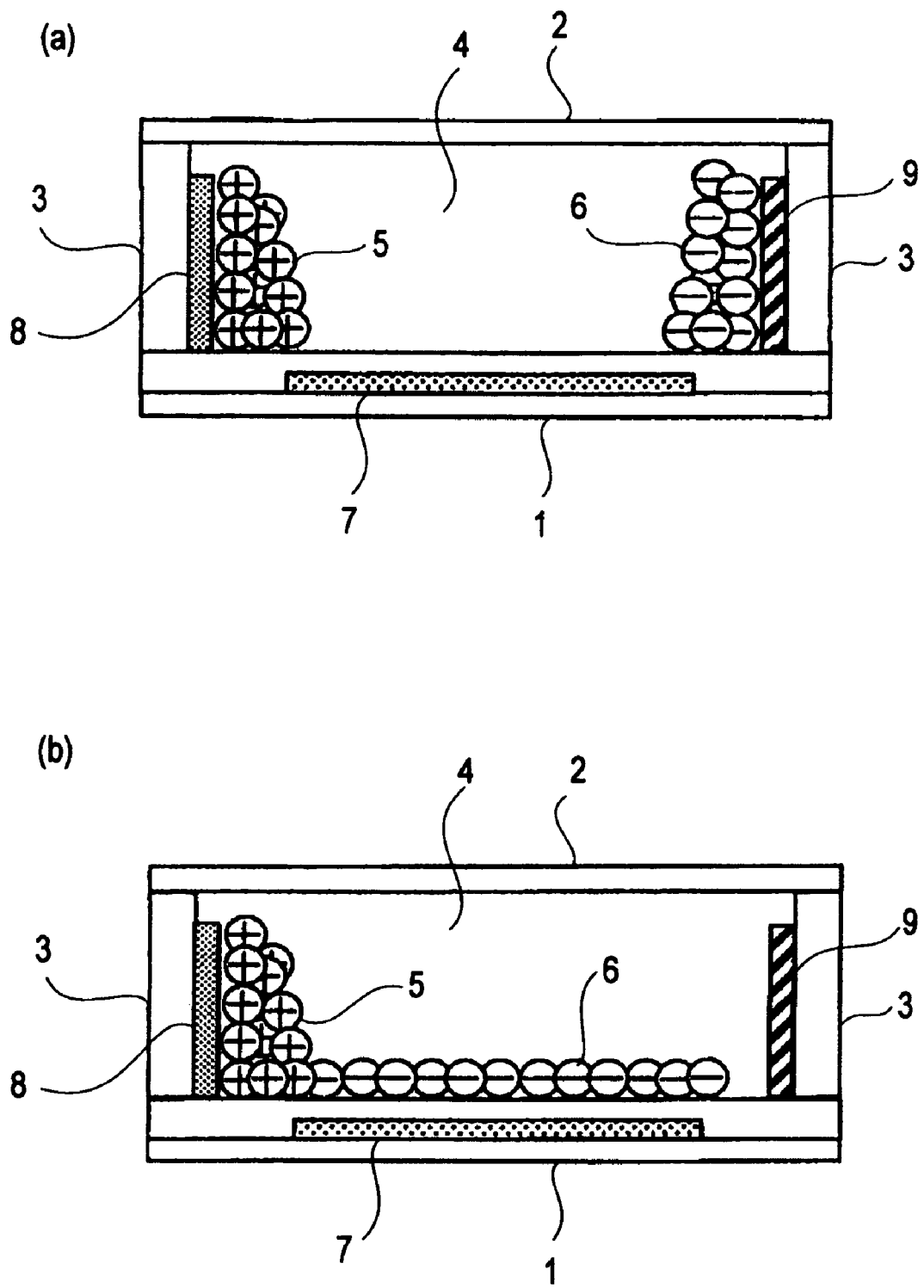
FIGS. 1(a) and 1(b) are schematic views showing a structure of an electrophoretic display device provided to an electrophoretic display apparatus according to a First Embodiment of the present invention.

FIGS. 1(a) and 1(b) are schematic structural views of an electrophoretic display device provided to an electrophoretic display apparatus according to First Embodiment of the present invention. In FIGS. 1(a) and 1(b), the electrophoretic display device includes a first substrate 1 and a second substrate which is disposed on a display side with a predetermined spacing between it and the first substrate 1.

In a dispersion medium 3 filled in a closed container defined by the first substrate 1a, the second substrate 2, and a partition wall 4 for holding the spacing between the first substrate 1 and the second substrate 2 at a certain distance, (electrophoretic) migration particles of two types (first particles 5 and second particles 6) having mutually different charge polarities and a substantially identical color are dispersed.

On the first substrate 1, a first electrode 7 is formed and along a side surface of the partition wall 4, a first reset electrode (second electrode) 8 and a second reset electrode (third electrode) 9 are formed. By applying a voltage to these first electrode 7, second electrode 8, and third electrode 9, an electric field is created in a closed space, corresponding to a pixel, defined by the first substrate 1, the second substrate 2, and the partition wall 4. By this electric field, the migration particles 5 and 6 of two types are moved selectively to effect display. The first electrode 7 has a size (planar area) larger than those of the second and third electrodes 8 and 9 and is colored a predetermined color.

Incidentally, in the electrophoretic display device having such a constitution, a first display operation for effecting display or display rewriting (rewriting of display) by applying a display voltage of a predetermined polarity to the first electrode 7 and a second display operation for effecting display or display rewriting by applying a display voltage of a polarity opposite to the predetermined polarity to the first electrode 7 are alternately performed.

Further, before the first display operation and the second display operation, a first reset operation for resetting the display (state) by applying a reset voltage of a predetermined polarity to the second and third electrodes 8 and 9 and a second reset operation for resetting the display by applying a reset voltage of a polarity opposite to the predetermined polarity to the second and third electrodes 8 and 9 are alternately performed, respectively.

Next, the above described display operation of the electrophoretic display device will be described. In this embodiment, the first particles 5 are positively charged black particles, the second particles 6 are negatively charged black particles, and the first electrode 7 is colored white.

The first display operation will be described with reference to FIGS. 1(a) and 1(b).

First, as shown in FIG. 1(a), by applying a voltage of 0 V to the first electrode 7, a voltage of −10 V (as a reset voltage of a predetermined polarity) to the second electrode 8, and a voltage of +10 V to the third electrode 9, the positively charged first particles 5 are moved to the second electrode side and the negatively charged second particles 6 are moved to the third electrode side, thus effecting reset of particle position (first reset operation). At this time, above the first electrode 7, the first and second particles 5 and 6 are not present, so that the first electrode 7 is exposed and white display is effected.

Next, as shown in FIG. 1(b), by applying a voltage of +10 V (as a display voltage of a predetermined polarity) to the first electrode 7, a voltage of 0 V to the second electrode 8, and a voltage of 0 V to the third electrode 9, the negatively charged second particles 6 are moved onto the first electrode 7. At this time, the first electrode 7 is covered with the block second particles 6, so that black display rewriting is effected. Incidentally, in the case of effecting halftone display rewriting, it is performed by changing, e.g., a magnitude or an application time of the voltage applied to the first electrode 7 to change an amount of the second particles 6 moved to the first electrode 7.

Next, the second display operation will be described with reference to FIGS. 2(a) and 2(b).

Figure 2:
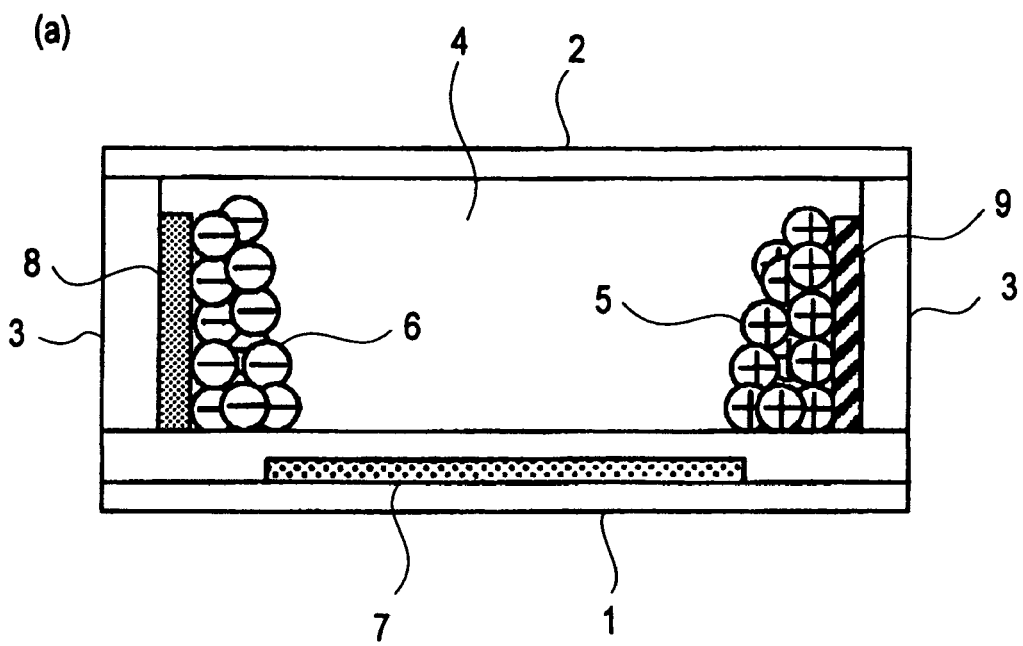
FIGS. 2(a) and 2(b) are schematic views for illustrating a display method operation of the electrophoretic display device shown in FIGS. 1(a) and 1(b).
Figure 2:
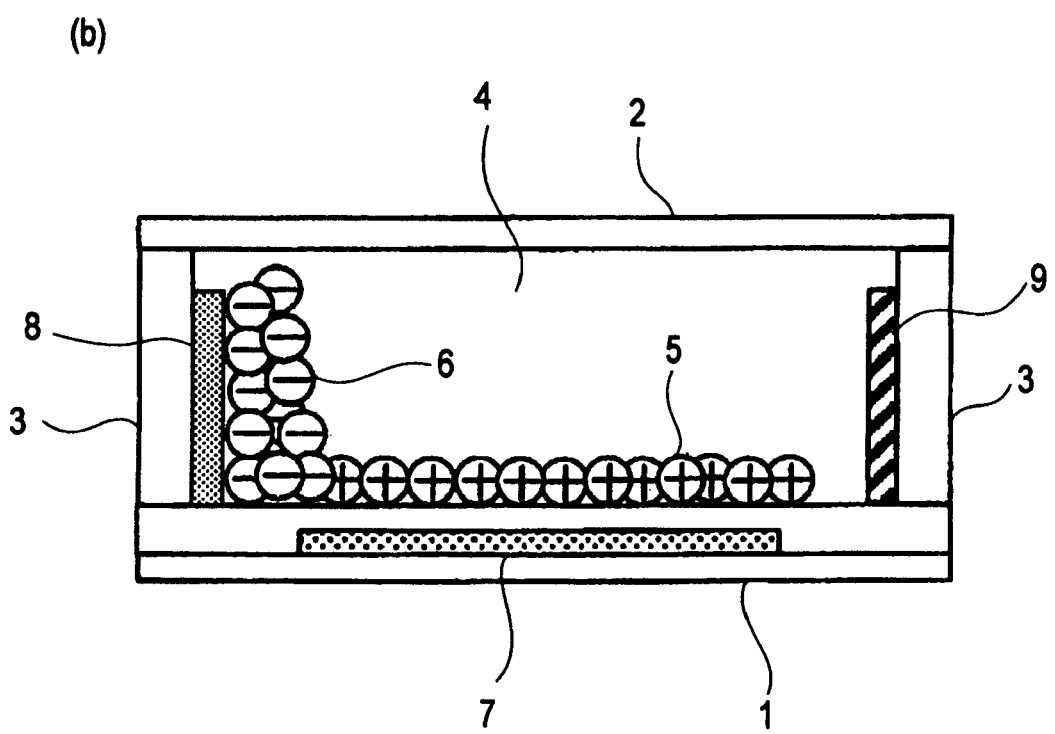

In this case, as shown in FIG. 2(a), by applying a voltage of 0 V to the first electrode 7, a voltage of +10 V (as a reset voltage of a polarity opposite to the predetermined polarity in the first reset operation) to the second electrode 8, and a voltage of −10 V to the third electrode 9, the positively charged first particles 5 are moved to the third electrode side and the negatively charged second particles 6 are moved to the second electrode side, thus effecting reset of particle position (second reset operation). At this time, above the first electrode 7, the first and second particles 5 and 6 are not present, so that the first electrode 7 is exposed and white display is effected.

Next, as shown in FIG. 2(b), by applying a voltage of −10 V (as a display voltage of a polarity opposite to the predetermined polarity in the first display operation) to the first electrode 7, a voltage of 0 V to the second electrode 8, and a voltage of 0 V to the third electrode 9, the positively charged first particles 5 are moved onto the first electrode 7. At this time, the first electrode 7 is covered with the block first particles 5, so that black display rewriting is effected. Incidentally, in the case of effecting halftone display rewriting, it is performed by changing, e.g., a magnitude or an application time of the voltage applied to the first electrode 7 to change an amount of the first particles 5 moved to the first electrode 7.

In this embodiment, both of the first display operation and the second display operation are black (halftone) display rewriting but employ the display voltages, opposite in polarity to each other, applied to the first electrode 7. More specifically, by using the migration particles 5 and 6 of two types which have charge polarities opposite to each other and a substantially identical color, it becomes possible to alternately perform the first display operation and the second display operation when the voltages of mutually different polarities are applied alternately to the first electrode 7.

Further, as described above, by alternately performing the first and second display operations through application of the voltages of mutually different polarities to the first electrode 7, even in the case of repeating the display rewriting, it is possible to make an effective voltage in the first electrode 7 a value close to averagely zero. As a result, accumulation of residual DC (voltage) component can be prevented and it becomes possible to effect stable display rewriting while suppressing display burn-in.

Generally, the electrophoretic display apparatus has a memory characteristic with respect to a display state, so that it is also possible to effect a display holding operation after the above described display operation. Here, in the case of continuing display of a display state after display rewriting of the display state, it is not necessary to perform the display operation as described above but only perform the display holding operation. Incidentally, the display holding operation is performed for the purpose of holding the position of the migration particles, thus being performed only by generally applying a voltage of 0 V to the respective electrodes.

Further, as another display holding operation, there are operations including, e.g., an operation wherein a minute voltage for suppressing movement of migration particles is applied or an operation wherein a pulse voltage for correcting the position of migration particles is applied periodically. The electrophoretic display apparatus has the memory characteristic as described above, so that it is possible to reduce power consumption. Incidentally, in the case where a display state is successively switched as in motion picture display, the above described first and second display operations are repetitively continued alternately.

In this embodiment, by using the migration particles of two types which have mutually different charge polarities and a substantially identical color, it becomes possible to effect the same gradation display even in the case where a voltage of a polarity opposite to a predetermined polarity of a previous voltage is applied to the electrode.

Incidentally, this opposite-polarity voltage is not necessarily required to be a complete objective voltage. Further, the color of the migration particles 5 and 6 of two types is not particularly limited but may be white, red, green, blue, magenta, cyan or yellow, other than black as in this embodiment.

Next, Second Embodiment of the present invention will be described.

Figure 3:
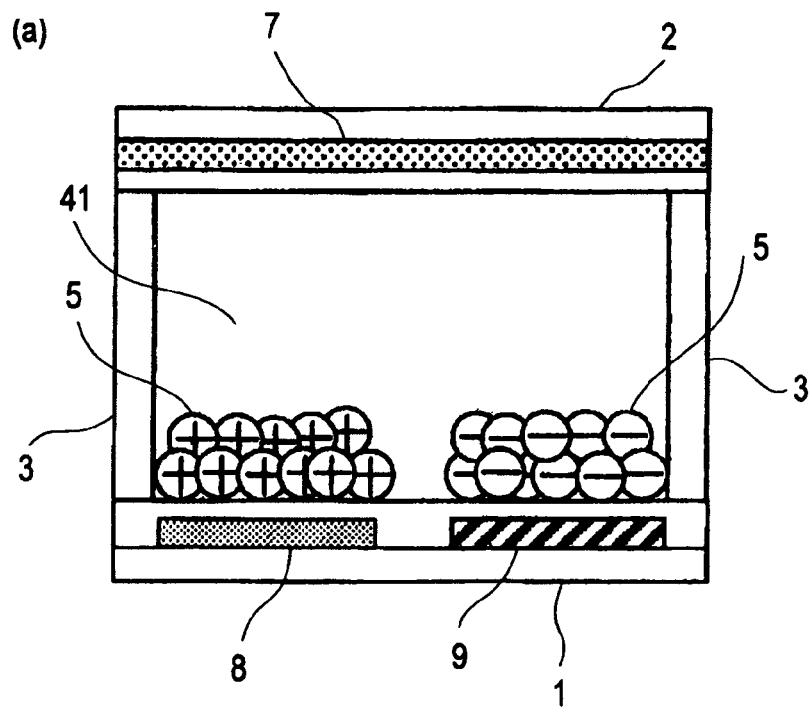
FIGS. 3(a) and 3(b) are schematic views showing a structure of an electrophoretic display device provided to an electrophoretic display apparatus, according to a Second Embodiment of the present invention.
Figure 3:
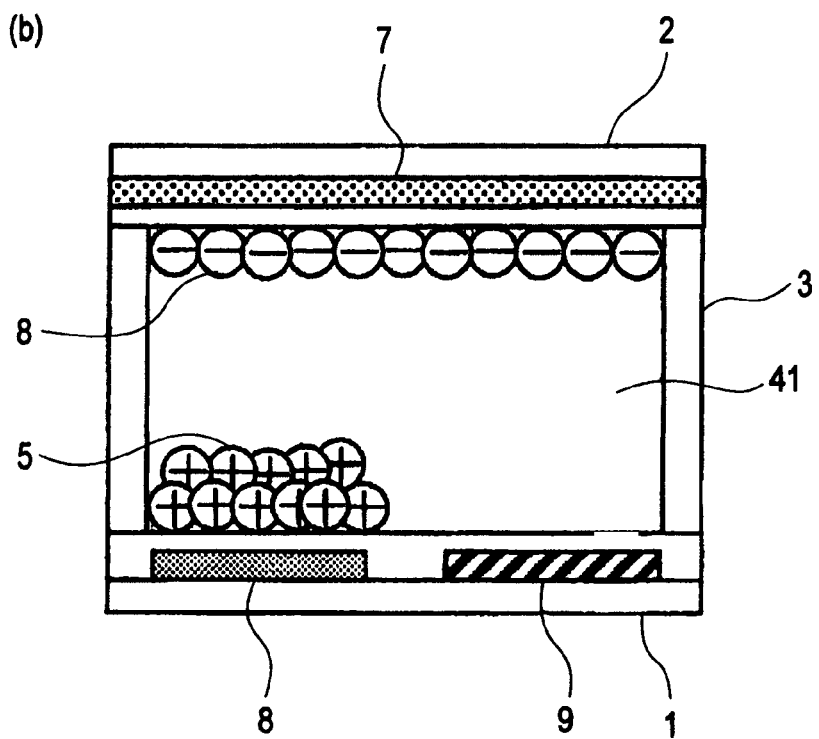

FIGS. 3(a) and 3(b) are schematic views showing a structure of an electrophoretic display device provided to an electrophoretic display apparatus according to this embodiment. In these figures, members or means represented by reference numerals identical to those shown in FIGS. 1(a) and 1(b) mean the same or corresponding members or means.

In FIGS. 3(a) and 3(b), in a closed space defined by the first substrate 1, the second substrate 2, and the partition wall 3, a colored dispersion medium 41 is filled. In this embodiment, a first electrode 7 is disposed on the second substrate 2, and a second electrode 8 and a third electrode 9 are disposed on the first substrate 1.

Also in this embodiment, the electrophoretic display device alternately performs a first display operation and a second display operation.

Next, the display operation of the electrophoretic display device in this embodiment will be described. In this embodiment, first particles 5 are positively charged white particles, second particles 6 are negatively charged white particles, and dispersion medium 41 is colored black. Further, the first electrode 7 is a common electrode for applying a substantially identical voltage to all the pixels and is supplied with a voltage of 0 V.

The first display operation will be described with reference to FIGS. 3(a) and 3(b).

First, as shown in FIG. 3(a), by applying a voltage of −10 V (as a reset voltage of a predetermined polarity) to the second electrode 8, and a voltage of +10 V to the third electrode 9, the positively charged first particles 5 are moved to the second electrode side and the negatively charged second particles 6 are moved to the third electrode side, thus effecting reset of particle position (first reset operation). At this time, the color of the black dispersion medium 41 is observed by an observer (viewer) from the second substrate side, thus effecting black display.

Next, as shown in FIG. 3(b), in order to provide a potential difference, corresponding to a display voltage of a predetermined polarity, between the first electrode 7 (common electrode) and the second electrode 8, by applying a voltage of −10 V to the second electrode 8, and a voltage of 0 V to the third electrode 9, the negatively charged second particles 6 are moved onto the first electrode 7. At this time, the color of the white second particles 6 is observed by the observer from the second substrate side, thus effecting white display rewriting. Incidentally, in the case of effecting halftone display rewriting, it is performed by changing, e.g., a magnitude or an application time of the voltage applied to the second electrode 8 and the third electrode 9 to change an amount of the second particles 6 moved to the first electrode 7.

Next, the second display operation will be described with reference to FIGS. 4(a) and 4(b).

Figure 4:
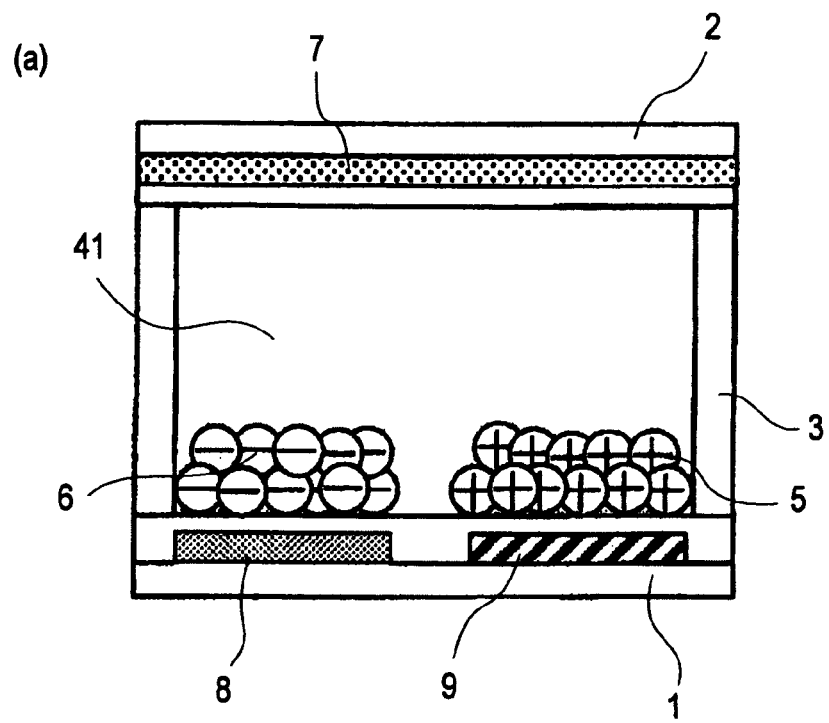
FIGS. 4(a) and 4(b) are schematic views for illustrating a display method operation of the electrophoretic display device shown in FIGS. 3(a) and 3(b).
Figure 4:
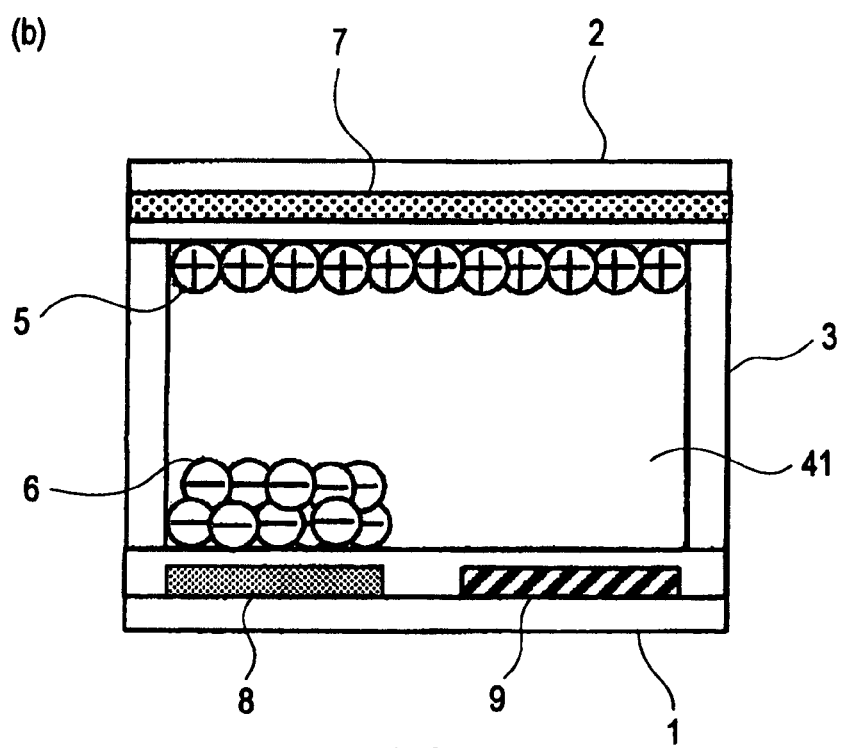

In this case, as shown in FIG. 4(a), by applying a voltage of +10 V (as a reset voltage of a polarity opposite to the predetermined polarity in the first reset operation) to the second electrode 8, and a voltage of −10 V to the third electrode 9, the positively charged first particles 5 are moved to the third electrode side and the negatively charged second particles 6 are moved to the second electrode side, thus effecting reset of particle position (second reset operation). At this time, the color of the black dispersion medium 41 is observed by the observer from the second substrate side, thus effecting black display.

Next, as shown in FIG. 4(b), of +10 to the second electrode 8 and in order to provide a potential difference, corresponding to a display voltage of a polarity opposite to the predetermined polarity in the first display operation, between the first electrode 7 (common electrode) and the third electrode 9, by applying a voltage of +10 V to the third electrode 9, the positively charged first particles 5 are moved onto the first electrode 7. At this time, the color of the white first particles 5 is observed by the observer from the second substrate side, thus effecting white display rewriting is effected. Incidentally, in the case of effecting halftone display rewriting, it is performed by changing, e.g., a magnitude or an application time of the voltage applied to the second electrode 8 and the third electrode 9 to change an amount of the first particles 5 moved to the first electrode 7.

In this embodiment, both of the first display operation and the second display operation are black (halftone) display rewriting but employ the voltages, opposite in polarity to each other, applied to the second and third electrodes 8 and 9.

Further, similarly as in First Embodiment described above, by alternately performing the first and second display operations through application of the voltages of mutually different polarities to the second and third electrodes 8 and 9, even in the case of repeating the display rewriting, it is possible to make an effective voltage a value close to averagely zero. As a result, accumulation of residual DC (voltage) component can be prevented and it becomes possible to effect stable display rewriting while suppressing display burn-in.

Incidentally, in First and Second Embodiments described above, the case of effecting display rewriting by using the electrophoretic force is described but the present invention is not limited thereto. In the present invention, it is also possible to effect display rewriting by utilizing a dielectrophoretic force.

Here, the dielectrophoretic force is a force, acting on particle in an electric field, which is clearly distinguished from the electrophoretic force, and is determined according to the following equation on the assumption that the particle is spherical:

$$F = 2\pi r^3 \varepsilon_1 \varepsilon_0 \left(\frac{\varepsilon_2 - \varepsilon_1}{\varepsilon_2 + 2\varepsilon_1}\right) \nabla E^2, \quad (1)$$

wherein F represents a dielectrophoretic force, r represents a radius of particle, $\in_0$ represents a dielectric constant (in vacuum), $\in_1$ represents a relative dielectric constant of dispersion medium, $\in_2$ represents a relative dielectric constant of particle, E represents an electric field, and ∇ represents a spatial differential.

As is understood from the equation (1), in the case where a non-uniform electric field is formed in a closed container (space), the migration particles are moved in a strong electric field area when a relative dielectric constant of the migration particles is larger than that of the surrounding dispersion medium. On the other hand, when the relative dielectric constant of the migration particles is smaller than that of the surrounding dispersion medium, the migration particles are moved in a weak electric field area.

The dielectrophoretic force acts even at the time of DC voltage application but at that time, the electrophoretic force exceeds the dielectrophoretic force, so that movement of the migration particles is less affected by the dielectrophoretic force.

However, in the case where an AC voltage is applied, an oscillatory electrophoretic force is produced at an AC voltage having a low frequency. However, when the frequency is increased, the migration particles gradually cannot follow the electrophoretic force is and the electrophoretic force is attenuated. As a result, the dielectrophoretic force dominantly acts on the migration particles.

Incidentally, as is understood from the equation (1), in the case where there is no difference in relative dielectric constant between the migration particles and the dispersion medium, the dielectrophoretic force is lost. For this reason, the migration particles and the dispersion medium are required to have mutually different relative dielectric constant values.

Further, a non-uniform electric field (electric field gradient) in the closed space can be created by appropriately providing a difference in dielectric constant between members and an arrangement and shape of electrodes. For example, by arranging the electrodes so as to provide a maximum or minimum distance therebetween, not a certain distance between the electrode surfaces, it is possible to provide a non-uniform electric field in the closed space. In this case, a strong electric field area of the non-uniform electric field is formed in such an area wherein a distance between the electrode surfaces becomes minimum and a weak electric field area is formed in such an area wherein a distance between the electrode surfaces becomes maximum.

Further, as is understood from the equation (1), a dielectrophoretic force acting direction is determined as one direction irrespective of the charge polarity of the migration particles when a relationship of relative dielectric constant between the migration particles and the dispersion medium is determined. Accordingly, by utilizing the dielectrophoretic force, it is possible to move the first and second particles having different charge polarities in the same area. Incidentally, in the present invention, a difference in relative dielectric constant between the migration particles and the dispersion medium may preferably be $5<|\in_1-\in_2|<50$, more preferably $8<|\in_1-\in_2|<20$.

When the dielectrophoretic force is small, a resultant response speed becomes slow. On the other hand, when the dielectrophoretic force is too large, the migration particles cannot be moved out of the strong (or weak) electric field area, thus causing drive failure of the electrophoretic display apparatus.

Further, the frequency of the AC voltage is not particularly limited but may be selected, so that it is not less than a frequency at which the dielectrophoretic force becomes dominant, in view of a moving speed of the migration particles, the frequency varies depending on electrode arrangement (non-uniform electric field distribution), particle size, a difference in relative dielectric constant between the migration particles and the dispersion medium, a charge amount of the migration particles, but it may generally preferably be not less than several hundred Hz. Further, the waveform of the AC voltage is also not particularly limited but may, e.g., be selected from rectangular wave, sine wave, triangular wave, etc.

Next, Third Embodiment of the present invention will be described.

Figure 5:
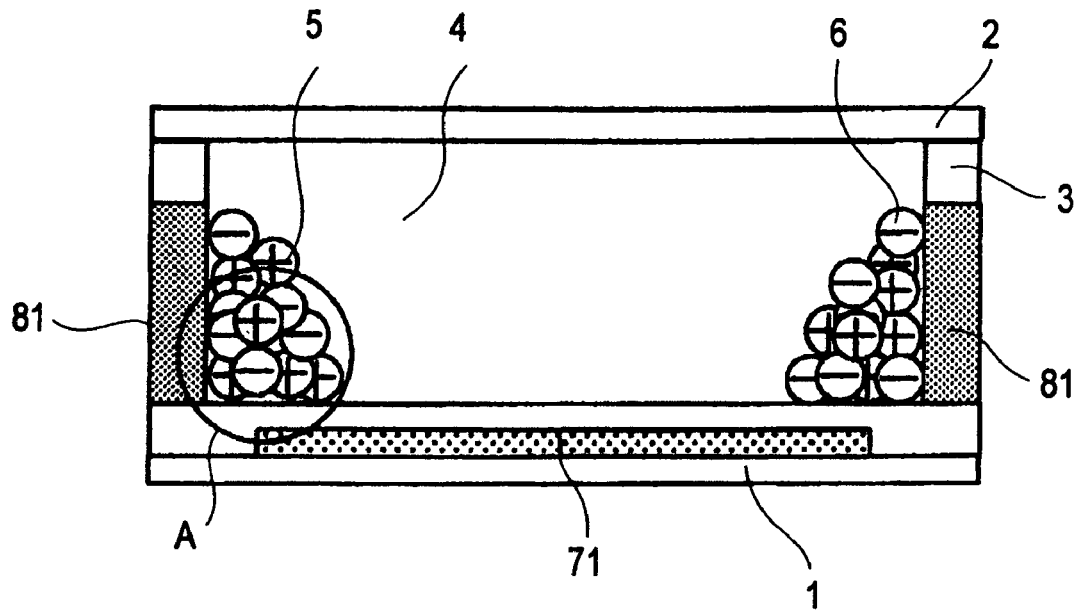
FIGS. 5(a) and 5(b) are schematic views showing a structure of an electrophoretic display device provided to an electrophoretic display apparatus according to a Third Embodiment of the present invention.
Figure 5:
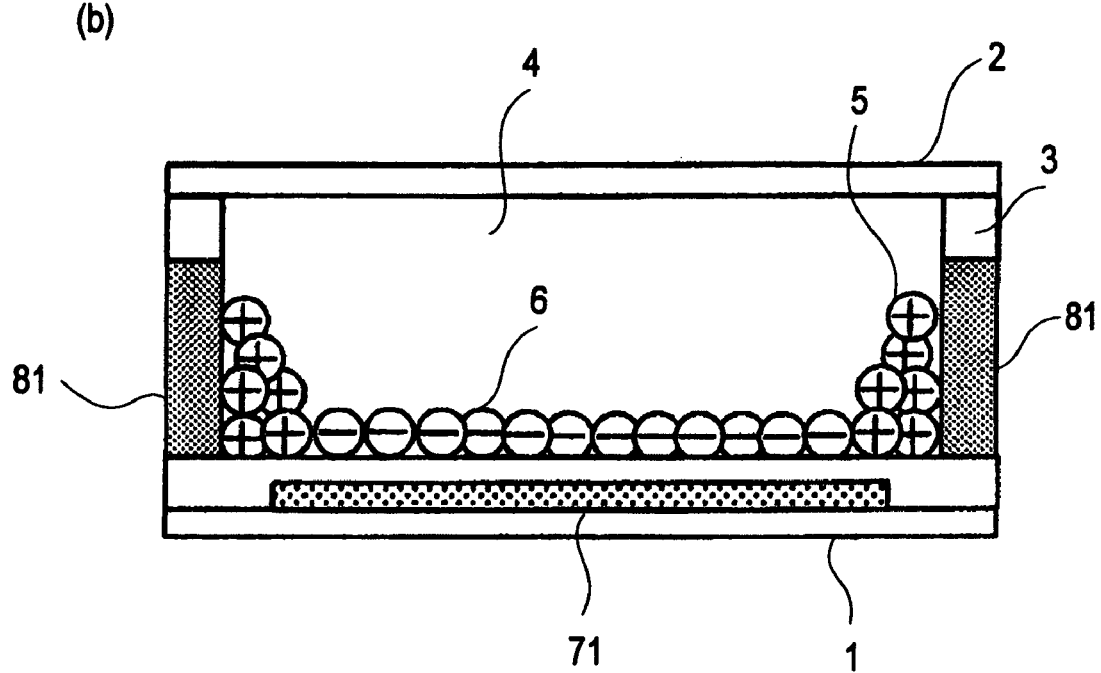

FIGS. 5(a) and 5(b) are schematic views showing a structure of an electrophoretic display device provided to an electrophoretic display apparatus, for effecting display rewriting by utilizing the dielectrophoretic force, according to this embodiment. In these figures, members or means represented by reference numerals identical to those shown in FIGS. 1(a) and 1(b) mean the same or corresponding members or means.

In FIGS. 5(a) and 5(b), a first electrode 71 is formed on a first substrate 1, and a second electrode 81 is a reset electrode provided to a partition wall 3 and is formed on the surface of or in the partition wall 3. More specifically, the second electrode 81 is formed in such a manner that it is closer to the first electrode 71 as it is closer to the first substrate 1, i.e., that a distance between the first electrode surface and the second electrode surface becomes minimum at a partition wall portion at a side surface of pixel.

By arranging the electrodes 71 and 72 so that the distance between the first and second electrode surfaces becomes minimum at the partition wall portion, a non-uniform electronic field distribution is formed. As a result, a strong electric field area can be created in an area, indicated by A in FIG. 5(a), in which the distance between the first and second electrode surfaces is smallest.

Next, the above described display operation of the electrophoretic display device in this embodiment will be described. In this embodiment, the first particles 5 are positively charged black particles, the second particles 6 are negatively charged black particles, and the first electrode 71 is colored white. Further, a relationship of (relative dielectric constant of migration particles)>(relative dielectric constant of dispersion medium) is satisfied, and the second electrode 81 is a common electrode from applying a substantially identical voltage to all the pixels and is supplied with a voltage of 0 V.

The first display operation will be described with reference to FIGS. 5(a) and 5(b).

First, as shown in FIG. 5(a), by applying an AC voltage of ±20 V to the first electrode 71, both of the positively charged first particles 5 and the negatively charged second particles 6 are moved in the strong electric field area (area A), thus effecting reset of particle position (first reset operation). At this time, the first electrode 71 is exposed and white display is effected.

Next, as shown in FIG. 5(b), by applying a voltage of +10 V (as a display voltage of a predetermined polarity) to the first electrode 71, the negatively charged second particles 6 are moved onto the first electrode 71. At this time, the first electrode 71 is covered with the block second particles 6, so that black display is effected. Incidentally, in the case of effecting halftone display rewriting, it is performed by changing, e.g., a magnitude or an application time of the voltage applied to the first electrode 71 to change an amount of the second particles 6 moved to the first electrode 71.

Next, the second display operation will be described with reference to FIGS. 6(a) and 6(b).

Figure 6:
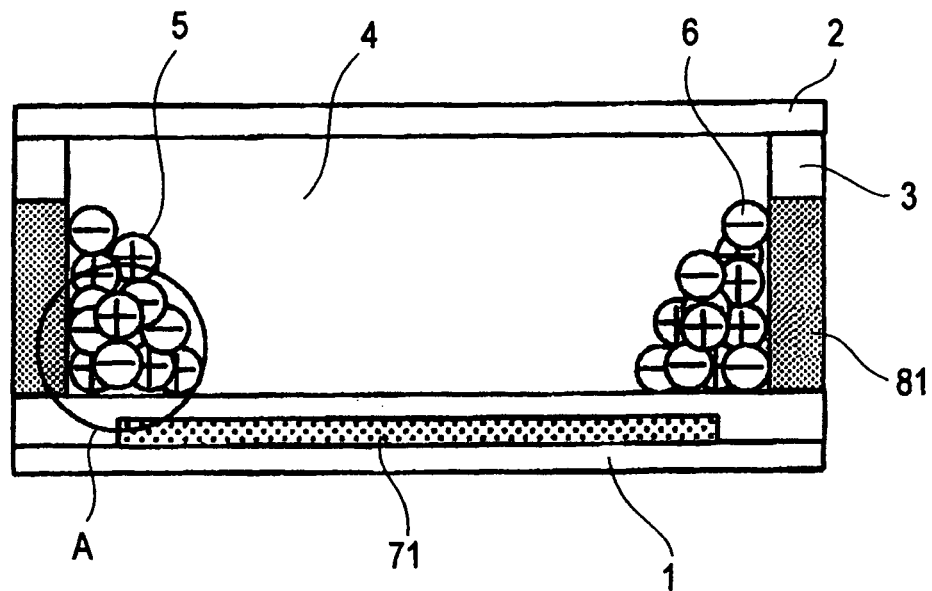
FIGS. 6(a) and 6(b) are schematic views for illustrating a display method operation of the electrophoretic display device shown in FIGS. 5(a) and 5(b).
Figure 6:
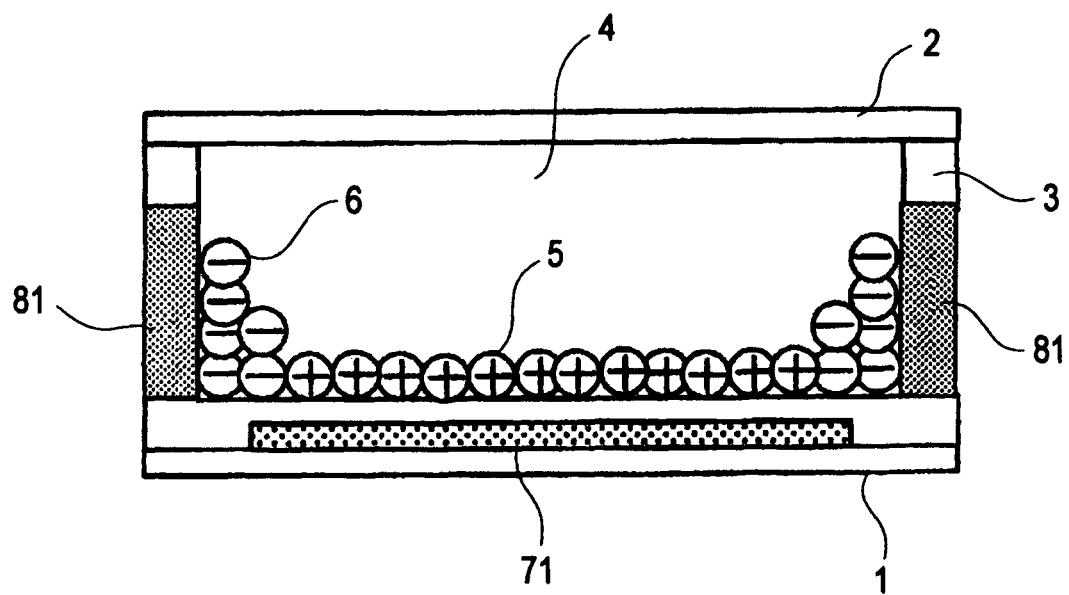

In this case, as shown in FIG. 6(a), by applying an AC voltage of ±20 V to the first electrode 71, the positively charged first particles 5 and the negatively charged second particles 6 are moved in the strong electric field area (area A), thus effecting reset of particle position (second reset operation). At this time, the first electrode 71 is exposed and white display is effected.

Next, as shown in FIG. 6(b), by applying a voltage of −10 V (as a display voltage of a polarity opposite to the predetermined polarity in the first display operation) to the first electrode 71, the positively charged first particles 5 are moved onto the first electrode 71. At this time, the first electrode 71 is covered with the block first particles 5, so that black display is effected. Incidentally, in the case of effecting halftone display rewriting, it is performed by changing, e.g., a magnitude or an application time of the voltage applied to the first electrode 71 to change an amount of the first particles 5 moved to the first electrode 71.

Further, also in this embodiment, similarly as in First and Second Embodiments described above, by alternately performing the first and second display operations, even in the case of repeating the display rewriting, the voltages of mutually different polarities are alternately applied to the first electrode 71, so that it is possible to make an effective voltage in the first electrode 7 a value close to averagely zero. As a result, accumulation of residual DC (voltage) component can be prevented and it becomes possible to effect stable display rewriting while suppressing display burn-in.

Incidentally, in this embodiment, it becomes possible to move the migration particles of two types having different charge polarities in the same direction by performing the AC voltage reset operations with utilization of the dielectrophoretic force. As a result, it is possible to reduce the number of electrodes as described later with reference to FIG. 9.

In the foregoing description, such a constitution that the migration particles 5 and 6 and the dispersion medium 4 are filled in the closed space formed in the spacing between the first substrate 1 and the second substrate 2 is described but it is also possible to adopt such a constitution that the migration particles 5 and 6 and the dispersion medium 4 are encapsulated in a microcapsule and the microcapsule is disposed in a space corresponding to a pixel.

Hereinbelow, the present invention will be described more specifically based on Examples.

EXAMPLE 1

In this example, an electrophoretic display apparatus including the electrophoretic display device shown in FIGS. 1(a) and 1(b) according to First Embodiment of the present invention is prepared in the following manner. The electrophoretic display device includes a matrix panel having 600× 1800 pixels. Further, each of the pixels has a rectangular planar shape as shown in FIG. 7 and has a size of 40 μm (width)×120μ (length).

On a 1.1 mm-thick glass substrate as a first substrate 1, a thin film transistor (TFT) (not shown) and an IC (not shown), and other wirings necessary for drive are formed and thereon, an $Si_3N_4$ film as an insulating film is formed at the entire surface of the first substrate 1. Then, an Al layer is formed and subjected to patterning to form a first electrode 7. Incidentally, the first electrode 7 is communicated with the TFT through a contact hole which has been formed in advance.

Next, after the first electrode 7 is formed, a white (coloring) layer is formed on the first electrode 7 so as to cover the entire surface of the first electrode 7 by applying an acrylic resin liquid, in which a white pigment such as titanium oxide or alumina is dispersed, onto the surface of the first electrode 7.

Figure 7:
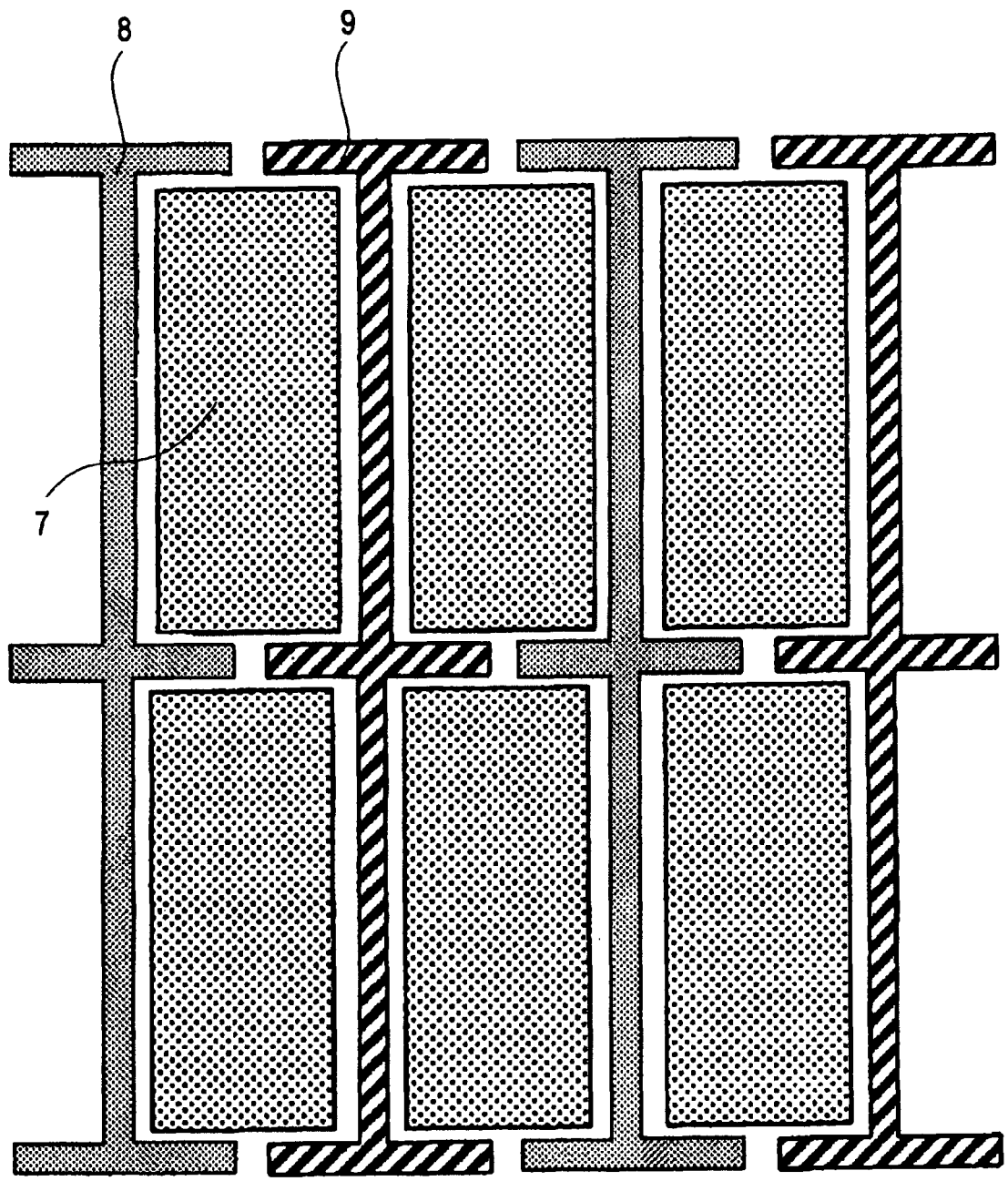
FIG. 7 is a schematic view showing a planar shape of pixels in the electrophoretic display device according to the First Embodiment of the present invention.

Then, according to electroplating, a second electrode 8 and the third electrode 9 which constitute a part of a partition wall 3 are formed, as a common electrode for the respective pixels, in a height of 10 μm and a width of 5 μm as shown in FIG. 7. Thereafter, on the second and third electrodes 8 and 9, the partition wall 3 having a height of 7 μm and a width of 5 μm is formed by use of a thin resist to provide the partition wall 3 with the entire (total) height of 17 μm.

Next, at each pixel, black migration particles of two types (first particles 5 and second particles 6) and a dispersion medium 4 of isoparaffin (trade name: "ISOPAR", mfd. by Exxon Corp.) are filled. In the dispersion medium 4, a charge control agent is contained. The first particles 5 are positively charged and the second particles 6 are negatively charged.

On the partition wall 3, a second substrate 2 is disposed to seal the dispersion medium 4 to complete an electrophoretic display device.

Next, the thus prepared electrophoretic display device is connected with an unshown driver to test the first display operation and the second display operation described above.

First, the first display operation will be described with reference to FIGS. 1(a) and 1(b).

In this case, by applying a voltage of 0 V to the first electrode 7 through the TFT and voltages of −10 V and +10 V to the second and third electrodes 8 and 9 (common electrode for all the pixels), respectively, the pixels at the entire panel surface are reset in a white state.

Then, by applying a voltage of 0 V to the second and third electrodes 8 and 9 and a positive-polarity voltage, corresponding to a predetermined gradation level, to the first electrode 7 through the TFT. For example, in the case of black display, a voltage of +10 V is applied to the first electrode 7, whereby all the negatively charged second particles 6 are distributed over the entire surface of the first electrode 7. Incidentally, in the case of gradation display, a voltage modulation is performed by changing the applied voltage (0 V, +2 V, +4 V, +6 V, +8 V, etc.) to change an amount of the second particles 6 moved onto the first electrode 7.

Next, the second display operation will be described with reference to FIGS. 2(a) and 2(b).

In this case, by applying a voltage of 0 V to the first electrode 7 through the TFT and voltages of +10 V and −10 V to the second and third electrodes 8 and 9 (common electrode for all the pixels), respectively, the pixels at the entire panel surface are reset in a white state.

Then, by applying a voltage of 0 V to the second and third electrodes 8 and 9 and a negative-polarity voltage, corresponding to a predetermined gradation level, to the first electrode 7 through the TFT. For example, in the case of black display, a voltage of −10 V is applied to the first electrode 7, whereby all the negatively charged second particles 6 are distributed over the entire surface of the first electrode 7. Incidentally, in the case of gradation display, a voltage modulation is performed by changing the applied voltage (0 V, −2 V, −4 V, −6 V, −8 V, etc.) to change an amount of the first particles 5 moved onto the first electrode 7.

Figure 8:
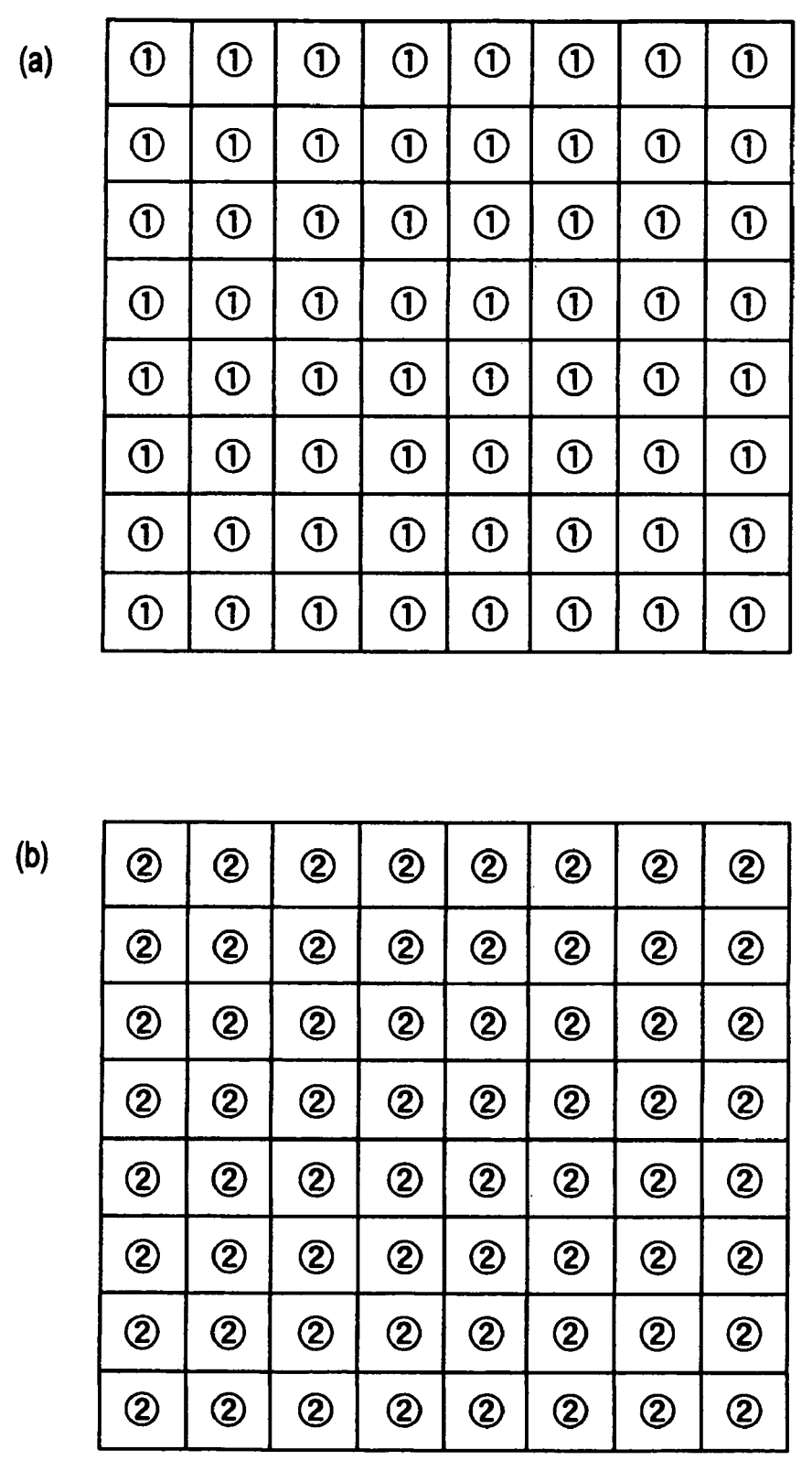

A driving method of the tested matrix panel will be described with reference to FIGS. 8(a) and 8(b) in which 8×8 matrix panel is shown for convenience of explanation. In FIGS. 8(a) and 8(b), each square corresponds to each pixel and a circled number 1 represents a first display operation and a circled number 2 represents a second display operation.

In this example, display rewriting is performed in such a manner that the display operation shown in FIG. 8(a) and the display operation shown in FIG. 8(b) are alternatively repeated. More specifically, in an entire frame (period), the first display operation and the second display operation are repetitively performed alternately while performing the first reset operation and the second reset operation between the display operations shown in FIGS. 8(b) and 8(a) and between the display operations shown in FIGS. 8(a) and 8(b), respectively. In this driving method, a polarity of voltage applied is changed for each frame. Accordingly, this driving method is referred to as a "frame inversion driving method".

The electrophoretic display apparatus in this example has a memory characteristic with respect to a display state, so that when display of a previous display state is continued after display rewriting, a display holding operation in which a voltage of 0 V is applied to the respective electrodes is performed. Further, in the case where the display state is successively changed as in motion picture display, the above described frame inversion driving method is repetitively performed.

In this example, even in the case where display rewriting is repeated according to the above described (frame inversion) driving method, the respective electrodes are alternately supplied with the voltages of different polarities, so that an effective voltage can be averagely made a value close to zero. As a result, accumulation of a residual DC (voltage) component can be prevented and it is possible to perform stable display rewriting while suppressing display burn-in.

EXAMPLE 2

Figure 9:
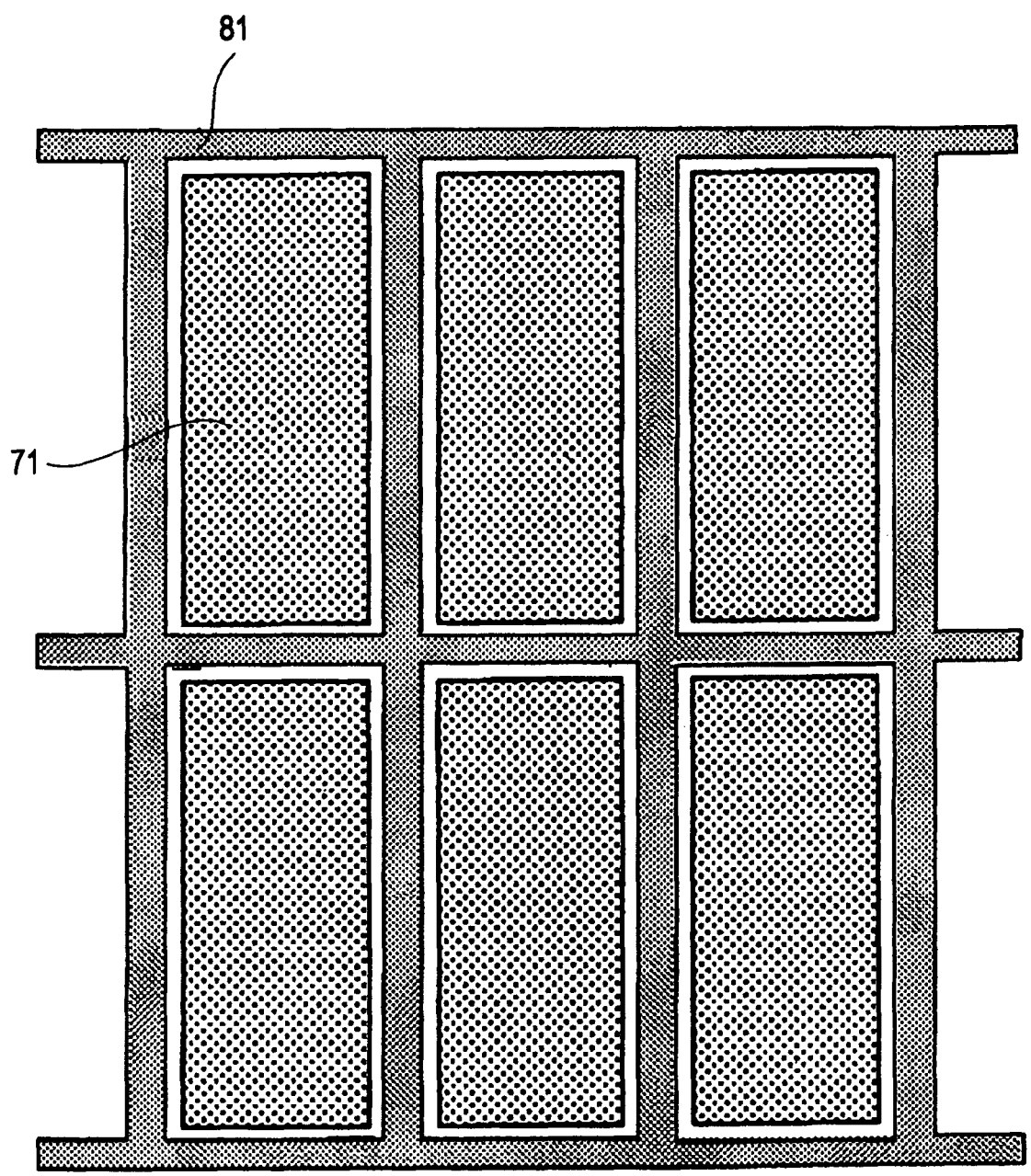
FIG. 9 is a schematic view showing a planar shape of pixels in the electrophoretic display device according to the Third Embodiment of the present invention.

In this example, an electrophoretic display apparatus including the electrophoretic display device shown in FIGS. 5(a) and 5(b) is prepared in the following manner. The electrophoretic display device includes a matrix panel having 600×1800 pixels. Further, each of the pixels has a rectangular planar shape as shown in FIG. 9 and has a size of 40 μm (width)×120μ (length). In this example, electrodes include a first electrode 71 and a second electrode 81 as described above.

On a 1.1 mm-thick glass substrate as a first substrate 1, a thin film transistor (TFT) (not shown) and an IC (not shown), and other wirings necessary for drive are formed and thereon, an $Si_3N_4$ film as an insulating film is formed at the entire surface of the first substrate 1. Then, an Al layer is formed and subjected to patterning to form a first electrode 71. Incidentally, the first electrode 71 is communicated with the TFT through a contact hole which has been formed in advance.

Further, a surface unevenness is provided to the surface of the first electrode 71, whereby incident light is reflected diffusedly to assume a white.

Then, according to electroplating, a second electrode 81 which also functions as a partition wall 3 is formed, as a common electrode for the respective pixels, in a height of 10 μm and a width of 5 μm as shown in FIG. 9. Thereafter, on the second electrode 81, the partition wall 3 having a height of 7 μm and a width of 5 μm is formed by use of a thin resist to provide the partition wall 3 with the entire (total) height of 17 μm.

Next, at each pixel, black migration particles of two types (first particles 5 and second particles 6) and a dispersion medium 4 of isoparaffin (trade name: "ISOPAR", mfd. by Exxon Corp.) are filled. In the dispersion medium 4, a charge control agent is contained. The first particles 5 are positively charged and the second particles 6 are negatively charged.

The migration particles and the dispersion medium satisfy a relationship of (relative dielectric constant of migration particles)>(relative dielectric constant of dispersion medium) and provide a difference in dielectric constant therebetween of not less than 8.

On the partition wall 3, a second substrate 2 is disposed to seal the dispersion medium 4 to complete an electrophoretic display device.

Next, the thus prepared electrophoretic display device is connected with an unshown driver to test the first display operation and the second display operation described above.

First, the first display operation will be described with reference to FIGS. 5(a) and 5(b).

In this case, the second electrode 81 (common electrode for all the pixels) is supplied with a voltage of 0 V.

First, by applying a sine wave (a voltage of ±15 V, a frequency of 1 kHz) as an AC voltage to the first electrode 71 through the TFT, the pixels at the entire panel surface are reset in a white state.

Then, by applying a positive-polarity voltage, corresponding to a predetermined gradation level, to the first electrode 71 through the TFT. For example, in the case of black display, a voltage of +10 V is applied to the first electrode 71, whereby all the negatively charged second particles 6 are distributed over the entire surface of the first electrode 71. Incidentally, in the case of gradation display, a voltage modulation is performed by changing the applied voltage (0 V, +2 V, +4 V, +6 V, +8 V, etc.) to change an amount of the second particles 6 moved onto the first electrode 71.

Next, the second display operation will be described with reference to FIGS. 6(a) and 6(b).

In this case, the second electrode 81 (common electrode for all the pixels) is supplied with a voltage of 0 V.

First, by applying a sine wave (a voltage of ±15 V, a frequency of 1 kHz) as an AC voltage to the first electrode 71 through the TFT, the pixels at the entire panel surface are reset in a white state.

Then, by applying a negative-polarity voltage, corresponding to a predetermined gradation level, to the first electrode 71 through the TFT. For example, in the case of black display, a voltage of +10 V is applied to the first electrode 71, whereby all the negatively charged second particles 6 are distributed over the entire surface of the first electrode 71. Incidentally, in the case of gradation display, a voltage modulation is performed by changing the applied voltage (0 V, −2 V, −4 V, −6 V, −8 V, etc.) to change an amount of the second particles 6 moved onto the first electrode 71.

A driving method of the tested matrix panel will be described with reference to FIGS. 10(a) and 10(b).

Figure 10:
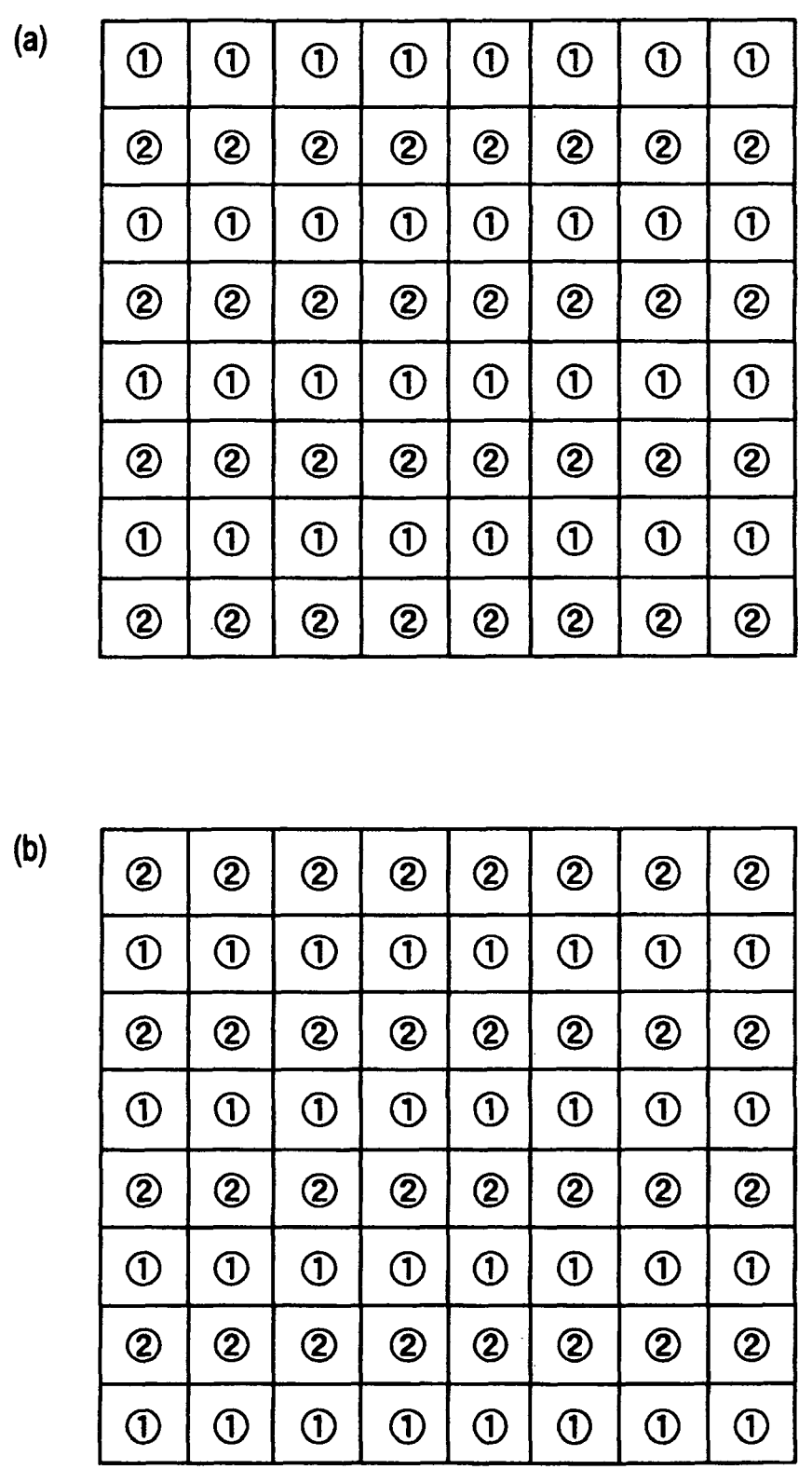

Also in this example, display rewriting is performed in such a manner that the display operation shown in FIG. 10(a) and the display operation shown in FIG. 10(b) are alternatively repeated. More specifically, in this example, every two adjacent (horizontal) scanning lines, the first display operation and the second display operation are repetitively performed alternately while performing the reset operation between the display operations shown in FIGS. 8(a) and 8(b). In this driving method, a polarity of voltage applied is changed for each scanning line. Accordingly, this driving method is referred to as a "line inversion driving method".

The electrophoretic display apparatus in this example has a memory characteristic with respect to a display state, so that when display of a previous display state is continued after display rewriting, a display holding operation in which a voltage of 0 V is applied to the respective electrodes is performed. Further, in the case where the display state is successively changed as in motion picture display, the above described line inversion driving method is repetitively performed.

In this example, even in the case where display rewriting is repeated according to the above described (line inversion) driving method, the first electrode 71 is alternately supplied with the voltages of different polarities, so that an effective voltage can be averagely made a value close to zero. As a result, accumulation of a residual DC (voltage) component can be prevented and it is possible to perform stable display rewriting while suppressing display burn-in.

EXAMPLE 3

In this example, an electrophoretic display apparatus is prepared and subjected to the display operations in the same manner as in Example 2.

Figure 11:
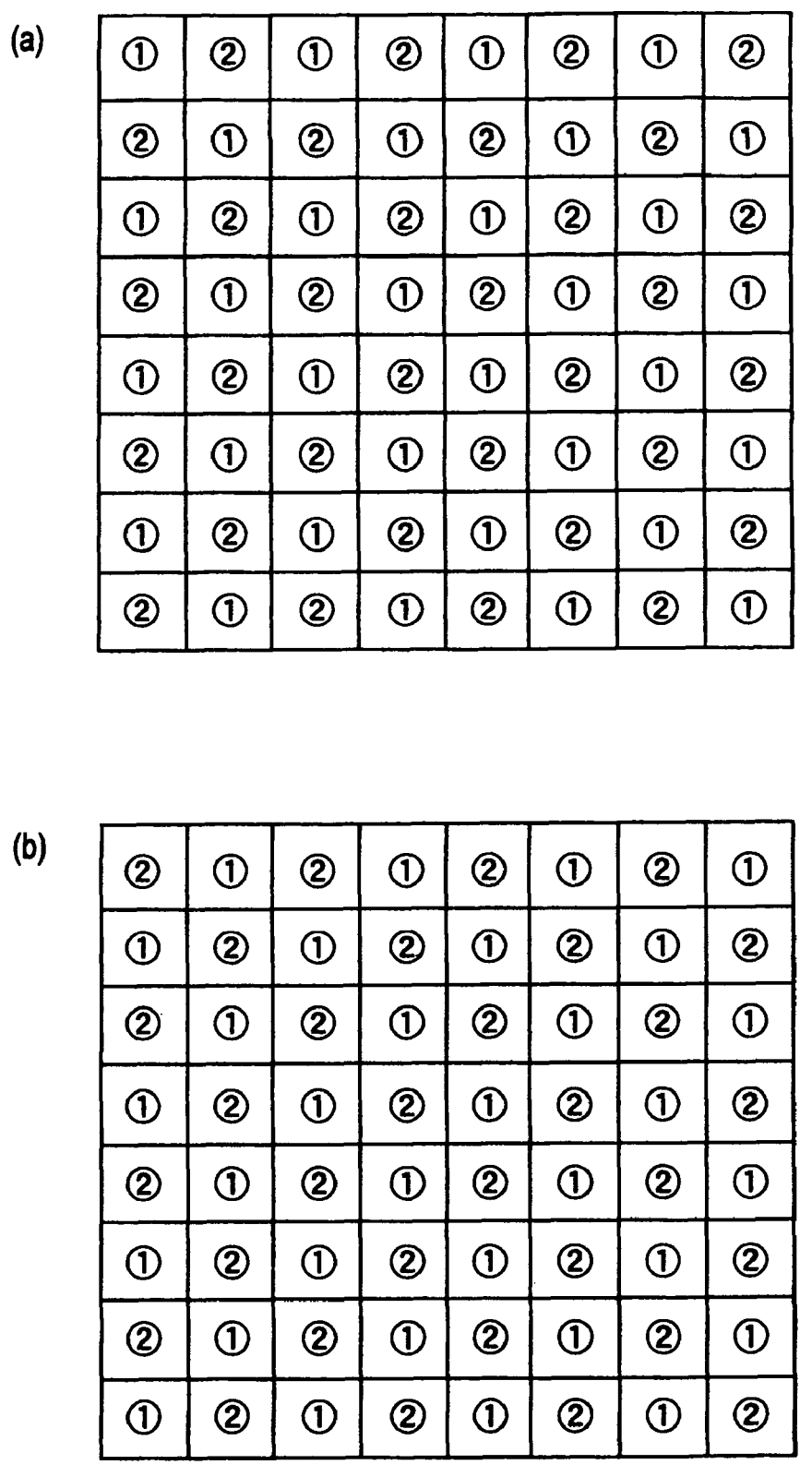

A driving method of the tested matrix panel will be described with reference to FIGS. 11(a) and 11(b).

Also in this example, display rewriting is performed in such a manner that the display operation shown in FIG. 10(a) and the display operation shown in FIG. 10(b) are alternatively repeated. More specifically, in this example, every two adjacent pixels, the first display operation and the second display operation are repetitively performed alternately while performing the reset operation between the display operations shown in FIGS. 8(a) and 8(b). In this driving method, a polarity of voltage applied is changed for each adjacent pixel. Accordingly, this driving method is referred to as a "dot inversion driving method".

The electrophoretic display apparatus in this example has a memory characteristic with respect to a display state, so that when display of a previous display state is continued after display rewriting, a display holding operation in which a voltage of 0 V is applied to the respective electrodes is performed. Further, in the case where the display state is successively changed as in motion picture display, the above described dot inversion driving method is repetitively performed.

In this example, even in the case where display rewriting is repeated according to the above described (dot inversion) driving method, the first electrode 71 is alternately supplied with the voltages of different polarities, so that an effective voltage can be averagely made a value close to zero. As a result, accumulation of a residual DC (voltage) component can be prevented and it is possible to perform stable display rewriting while suppressing display burn-in.

While the invention has been described with reference to the structures disclosed herein, it is not confined to the details set forth and this application is intended to cover such modifications or changes as may come within the purposes of the improvements or the scope of the following claims.

INDUSTRIAL APPLICABILITY

According to the electrophoretic display apparatus of the present invention, as the migration particles, those of two types which have mutually different charge polarities and a substantially identical color are used, so that it becomes possible to drive the electrophoretic display apparatus by an AC voltage. Further, by alternately applying a display voltage of a predetermined polarity and a display electrode of a polarity opposite to the predetermined polarity to the display electrode for changing the distribution of the migration particles to effect display, even when the display or rewriting of the display is repetitively performed, it is possible to prevent accumulating of residual DC component to perform stable display repetitively.

The invention claimed is:

1. A display apparatus, comprising:
a first substrate upon which is situated a closed container;
first and second charged particles which are held in the closed container and have mutually different charge polarities and a substantially identical color; and
first, second and third electrodes for generating an electric field in the closed container wherein the second and third electrodes are substantially the same size and the first electrode is larger than the second and third electrodes, with the first electrode being disposed on the first substrate and with the second and third electrodes being disposed on opposite sides of the closed container and perpendicular to or across from the first electrode;
wherein said display apparatus successively and alternately executes a first display operation and a second display operation,
wherein in the first display operation, the first charged particles are collected on the first electrode by applying a first display voltage to the first electrode, a second display voltage to the second electrode and a third display voltage to the third electrode, wherein at least one of the second and third display voltages is a ground voltage, after a first reset operation in which the first and second charged particles are collected on the second electrode and on the third electrode by applying a first reset voltage to the first electrode, a second reset voltage to the second electrode and a third reset voltage to the third electrode wherein the second reset voltage and the third reset voltage have substantially equal magnitude and opposite polarity, and
wherein in the second display operation, the second charged particles are collected on the first electrode by applying a fourth display voltage to the first electrode and by applying a fifth display voltage to the second electrode and a sixth display voltage to the third electrode, wherein at least one of the fifth and sixth display voltages is a ground voltage, after a second reset operation in which the first and second charged particles are collected on the second electrode and on the third electrode by applying a fourth reset voltage to the first electrode, and by applying a fifth reset voltage to the second electrode and a sixth reset voltage to the third electrode, wherein the fifth reset voltage and the sixth reset voltage are, respectively, of substantially equal magnitude and opposite in polarity to the second reset voltage and the third reset voltage applied in the first reset operation.

2. An apparatus according to claim 1, further comprising:
a second substrate disposed oppositely to the first substrate; and
a partition wall, disposed between the first and second substrates, for defining the closed container;
wherein the second electrode is disposed at a part of the partition wall, and
wherein the third electrode is disposed oppositely to the second electrode at another part of the partition wall.

3. An apparatus according to claim 1, further comprising:
a second substrate disposed oppositely to the first substrate; and
a partition wall, disposed between the first and second substrates, for defining the closed container;
wherein the second electrode and the third electrode are disposed on the second substrate.

4. A driving method for driving a display apparatus comprising: a first substrate upon which is situated a closed container, first and second charged particles which are held in the closed container and which have opposite charge polarities and a substantially identical color, and first, second and third electrodes for generating an electric field in the closed container wherein the second and third electrodes are substantially the same size and the first electrode is larger than the second and third electrodes, the first electrode being disposed on the first substrate and the second and third electrodes being disposed on opposite sides of the closed container and perpendicular to or across from the first electrode; said driving method comprising the steps of:

successively and alternately executing a first display operation and a second display operation, wherein in the first display operation, the first charged particles are collected on the first electrode by applying a first display voltage to the first electrode, a second display voltage to the second electrode and a third display voltage to the third electrode, wherein at least one of the second and third display voltages is a ground voltage, after a first reset operation in which the first charged particles are collected on the second electrode and the second charged particles are collected on the third electrode by applying a first reset voltage to the first electrode, a second reset voltage to the second electrode and a third reset voltage to the third electrode wherein the second reset voltage and the third reset voltage have substantially equal magnitude and opposite polarity, and wherein in the second display operation, the second charged particles are collected on the first electrode by applying a fourth display voltage to the first electrode and by applying a fifth display voltage to the second electrode and a sixth display voltage to the third electrode, wherein at least one of the fifth and sixth display voltages is a ground voltage, after a second reset operation in which the second charged particles are collected on the second electrode and the first charged particles are collected on the third electrode by applying a fourth reset voltage to the first electrode, and by applying a fifth reset voltage to the second electrode and a sixth reset voltage to the third electrode, wherein the fifth reset voltage and the sixth reset voltage are, respectively, of substantially equal magnitude and opposite in polarity to the second reset voltage and the third reset voltage applied in the first reset operation.

* * * * *